United States Patent
Arslan et al.

(10) Patent No.: US 11,283,262 B2
(45) Date of Patent: *Mar. 22, 2022

(54) METHOD AND CONTROL DEVICE FOR OPERATING A STATIONARY, ELECTRIC ENERGY STORAGE THAT IS PROVIDED FOR AN ELECTRIC CONSUMPTION UNIT

(71) Applicant: Bayerische Motoren Werke Aktiengesellschaft, Munich (DE)

(72) Inventors: Eren Arslan, Munich (DE); Michelle Bogen, Mountain View, CA (US); Lukas Maul, Munich (DE); Florian van Triel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 275 days.

This patent is subject to a terminal disclaimer.

(21) Appl. No.: 16/565,696

(22) Filed: Sep. 10, 2019

(65) Prior Publication Data
US 2020/0083712 A1    Mar. 12, 2020

(30) Foreign Application Priority Data

Sep. 11, 2018    (EP) .................................... 18193854

(51) Int. Cl.
 *H02J 3/32*    (2006.01)
 *H02J 3/38*    (2006.01)
 *H02J 3/00*    (2006.01)
(52) U.S. Cl.
 CPC ................ *H02J 3/32* (2013.01); *H02J 3/005* (2013.01); *H02J 3/007* (2020.01); *H02J 3/008* (2013.01); *H02J 3/38* (2013.01)
(58) Field of Classification Search
 CPC .... H02J 3/32; H02J 3/007; H02J 3/005; H02J 3/008; H02J 3/38; H02J 3/14;
 (Continued)

(56) References Cited

U.S. PATENT DOCUMENTS 8,588,991 B1   11/2013   Forbes, Jr.
9,727,898 B2    8/2017   Park et al.
(Continued)

FOREIGN PATENT DOCUMENTS

CN    104466994 A    3/2015
CN    110034611 A    7/2019

OTHER PUBLICATIONS

Xue et al, "Field Implementation of a Real-time Battery Control Scheme for a Microgrid at the University of California, Riverside", 2019, p. 2859-2864 downloaded from the internet https://ieeexplore.ieee.org/document/8881076 (Year: 2019).*

(Continued)

*Primary Examiner* — Rocio Del Mar Perez-Velez
*Assistant Examiner* — Olvin Lopez Alvarez
(74) *Attorney, Agent, or Firm* — Crowell & Moring LLP

(57) ABSTRACT

A method operates an electric energy storage that is provided for an electric consumption unit, wherein the electric consumption unit is additionally coupled to an electric power grid. The method is characterized in that the control device performs the following steps of a) providing different operation logics for controlling the power flow as a function of the state of charge and of a total unit load, b) observing a status signal that is signaling the present and/or the next supply condition of the grid, c) selecting one of the operation logics as an active operation logic depending on a current value of the status signal, and d) operating the power converter according to the active operation logic.

14 Claims, 6 Drawing Sheets

(58) Field of Classification Search
CPC .... H02J 2300/20; H02J 3/381; H02J 2310/64; Y02B 70/3225; Y02B 70/30; Y04S 20/242; Y04S 20/222; Y04S 50/10
See application file for complete search history.

(56) References Cited

U.S. PATENT DOCUMENTS

| | | | |
|---|---|---|---|
| 10,270,249 B2 | 4/2019 | Covic et al. | |
| 10,454,271 B2 | 10/2019 | Covic et al. | |
| 10,775,824 B2 | 9/2020 | Main et al. | |
| 2005/0248316 A1* | 11/2005 | Kangas | H02J 7/0071 320/132 |
| 2006/0276938 A1 | 12/2006 | Miller | |
| 2007/0005192 A1 | 1/2007 | Schoettle et al. | |
| 2008/0046387 A1* | 2/2008 | Gopal | G01D 4/004 705/412 |
| 2008/0052145 A1 | 2/2008 | Kaplan et al. | |
| 2010/0217651 A1 | 8/2010 | Crabtree et al. | |
| 2011/0101779 A1* | 5/2011 | Patel | H02J 3/28 307/64 |
| 2011/0231028 A1 | 9/2011 | Ozog | |
| 2011/0304295 A1* | 12/2011 | McNally | H01M 10/46 320/101 |
| 2012/0296482 A1 | 11/2012 | Steven et al. | |
| 2013/0282193 A1 | 10/2013 | Tyagi et al. | |
| 2013/0334880 A1 | 12/2013 | Jerphagnon | |
| 2013/0345884 A1 | 12/2013 | Forbes, Jr. | |
| 2013/0346139 A1 | 12/2013 | Steven et al. | |
| 2013/0346768 A1 | 12/2013 | Forbes, Jr. | |
| 2014/0191577 A1* | 7/2014 | Bando | H02J 3/381 307/48 |
| 2014/0350743 A1* | 11/2014 | Asghari | G05B 13/048 700/297 |
| 2015/0088576 A1 | 3/2015 | Steven et al. | |
| 2015/0094968 A1 | 4/2015 | Jia et al. | |
| 2015/0227124 A1 | 8/2015 | Arya et al. | |
| 2015/0277410 A1 | 10/2015 | Gupta et al. | |
| 2016/0056628 A1 | 2/2016 | Burstall et al. | |
| 2016/0079757 A1 | 3/2016 | Matan et al. | |
| 2016/0248255 A1 | 8/2016 | Rive et al. | |
| 2017/0091878 A1 | 3/2017 | Subburaj | |
| 2018/0076629 A1 | 3/2018 | McMorrow et al. | |
| 2018/0090935 A1* | 3/2018 | Asghari | G05B 19/042 |
| 2018/0144414 A1 | 5/2018 | Lee et al. | |
| 2019/0013672 A1 | 1/2019 | McDaniel et al. | |
| 2019/0033353 A1 | 1/2019 | Quinn et al. | |
| 2019/0089163 A1 | 3/2019 | Wellner | |
| 2019/0148945 A1* | 5/2019 | Nakayama | H02J 3/32 700/291 |
| 2019/0260050 A1 | 8/2019 | Chigan et al. | |
| 2020/0083712 A1 | 3/2020 | Arslan et al. | |

OTHER PUBLICATIONS

Extended European Search Report issued in counterpart European Application No. 18193860.6 dated Feb. 22, 2019 (nine (9) pages).
Extended European Search Report issued in counterpart European Application No. 18193854.9 dated Feb. 25, 2019 (nine (9) pages).
Walker et al., "Incentives For The Reuse Of Electric Vehicle Batteries For Load-Shifting In Residences", International Journal of Process Systems Engineering, Jan. 2015, pp. 1-20 (20 pages).
Koutsopoulos et al., "Challenges In Demand Load Control For The Smart Grid", University of Thessaly and Center for Research and Technology Hellas, Sep./Oct. 2011, pp. 16-21, (six (6) pages).
Lavrova et al., "Analysis of Battery Storage Utilization for Load Shifting and Peak Smoothing on a Distribution Feeder in New Mexico", 2011, pp. 1-6, (six (6) pages).
Bao et al., "Battery Energy Storage System Load Shifting Control based on Real Time Load Forecast and Dynamic Programming", International Conference on Automation Science and Engineering, Aug. 20-24, 2012, pp. 304-356, (six (6) pages).

* cited by examiner

METHOD AND CONTROL DEVICE FOR OPERATING A STATIONARY, ELECTRIC ENERGY STORAGE THAT IS PROVIDED FOR AN ELECTRIC CONSUMPTION UNIT

CROSS REFERENCE TO RELATED APPLICATION

This application claims priority under 35 U.S.C. § 119 from European Patent Application No. 18193854.9, filed Sep. 11, 2018, the entire disclosure of which is herein expressly incorporated by reference.

This application contains subject matter related to U.S. application Ser. No. 16/565,667, entitled "Method and Control Device for Operating a Stationary, Electric Energy Storage that is Provided for an Electric Consumption Unit" filed on even date herewith.

BACKGROUND AND SUMMARY OF THE INVENTION

The invention is concerned with a method for operating an electric energy storage that is provided for an electric consumption unit. Such an electric consumption unit may be, e.g., a household. The electric consumption unit is also coupled to an electric power grid. The grid supplies electric power to the consumption unit under different supply conditions at different time periods. The electric power flow of the energy storage for discharging electric power to the electric consumption unit at one time and for charging the energy storage at another time is controlled by a control device which is also part of the invention. The invention also provides a system comprising the electric consumption unit and an electric energy storage and the inventive control device for the energy storage.

Utilizing stationary battery storage systems at residential households can play a big role in supporting grid resiliency but also in optimizing user or customer electricity bills. Different rate or tariff structures, e.g., in the United States, create an opportunity for using batteries or other energy storages as a storage resource to optimize the energy/grid usage times of customers for lowering their electricity expenses. The production of electricity from solar or another regenerative source does often not match with the typical consumption behavior of residential consumers. Especially in sunny states such as California or Hawaii solar production is highest during daytime hours. Usually the peak demand from consumers on the grid occurs later in the day during evening hours when the solar production is ramping down. Therefore, there is the need for shifting energy to times when the demand is highest. Because of this misalignment of energy supply and demand, Hawaii, for example, initiated a regulation that no longer reimburses customers for feeding excess solar energy into the grid. Without stationary battery storage, excess solar energy must be curtailed or customers are forced to downsize their solar systems. Stationary battery storage or another electric energy storage has the capability to shift daytime renewable energy for utilization on household loads in the evening, effectively increasing the percentage of renewable energy on an overall energy usage basis that can be consumed onsite, i.e. inside the electric consumption unit, like a household.

An algorithmic logic should cover these components: Energy usage of customers should be optimized to meet renewable energy feed-in requirements, if existing, provide an increased solar usage in the energy usage profiles of customers and optimize the customer's electricity bill by shifting loads intelligently.

It is an object of the present invention to control the electric power flow of a stationary energy storage that may be provided at an electric consumption unit as a storage for renewable energy and as an alternative power source during time periods when electric energy from a power grid is most expensive.

The invention provides a method for operating an electric energy storage that is provided for an electric consumption unit. Such an energy storage may comprise, e.g., at least one rechargeable battery and/or at least one array of capacitors. A storage capacity of such an energy storage may be larger than 10 Wh. Preferably, the energy storage is stationary. The electric consumption unit may be, e.g., a household or an office building. For energy transfer, the energy storage may be connected to the electric consumption unit or they may both be connected to the same public electric power grid. In any case, the electric consumption unit is additionally coupled to the electric power grid. The grid supplies electric power to the consumption unit under different supply conditions at different time periods. For example, different rates or tariffs may apply for the transferal of electric energy between the grid and the electric consumption unit.

For the energy storage, a control device observes the state of charge of the energy storage and controls an electric power flow of the energy storage by means of an electric power converter. Such a power converter may be, e.g., a bidirectional inverter or another power electronic device. The electric power flow is set to a value which results at each point in time from a respective active operation algorithm or operation logic. The control device performs the following steps:

providing different operation logics for controlling the power flow as a function of the state of charge and as a function of a total unit load, wherein the total unit load is a net balance value of a power consumption in the consumption unit and an internal power delivery or generation in the consumption unit, such that a negative total unit load in the consumption unit may indicate a surplus of electric power generated and not consumed by the consumption unit itself (for example, the consumption unit may comprise or be connected to a regenerative energy source—e.g. a solar energy source);

observing a status signal that is signaling the present and/or the next supply condition of the grid, such that it may be known to the control device which supply condition applies for the current time period and/or for the next time period;

selecting one of the operation logics as an active operation logic depending on a current value of the status signal, operating the power converter according to the active operation logic.

The different economic supply conditions may comprise different prices per energy unit (e.g. per Wh). Listed in the order of the height of the respective price, there may be a "peak supply condition", a "partial-peak supply condition" and/or an "off-peak supply condition". The said status signal, signaling the current and/or next supply condition, may be an external signal received by the control device or it may be derived by the control device itself, e.g. on the basis of a table that is listing the supply conditions and the corresponding time periods, wherein by means of a clock signal, it may be derived, which time period is currently active or valid.

The total unit load may be the resulting need of the electric consumption unit regarding its electric power, considering solar self-consumption, i.e. the electric consumption unit tries to satisfy its demand for electric power on the basis of the electric power delivered by a regenerative energy source and the total unit load indicates, whether more electric power is needed (total unit load greater 0) or whether there is a surplus of electric power from the regenerative power source (total unit load smaller 0).

Note that positive and negative values result from the way how the direction of power flow is counted. If the power flow is measured in the opposite direction, the signs (greater 0, smaller 0) will, of course, be different. The invention is not dependent on the direction, in which the power flow is measured.

The invention also comprises embodiments that provide additional advantages.

In one embodiment, one of the supply conditions is a peak supply condition which is valid during peak periods and for the peak supply condition a peak operation logic is selected, which comprises the following logic:

if the total unit load is greater 0, indicating a net power consumption, and the state of charge is greater than a predefined peak threshold, a negative power flow is set for discharging the energy storage, otherwise, with the state of charge below the peak threshold, the power flow may be set to 0, if the total unit load is smaller 0, indicating a net power delivery, the power flow is set to 0 independently of the state of charge in the case that a so called net energy metering (NEM) applies for the electric consumption unit, or otherwise, if at the same time the state of charge is below a predefined maximum level, a positive power flow is set for charging the energy storage. With the state of charge being at a maximum level (energy storage fully charged), the power flow may be set to 0.

The peak threshold may have a value greater 0, e.g. greater 10%. This prevents damage that may otherwise occur to the energy storage. According to the described peak operation logic, if the total load unit is smaller 0 and NEM applies, the excess energy will not be used for charging the energy storage. Instead, the excess energy may be sold to the utility, respectively to the grid operator, i.e. it may be transferred into the power grid.

Net energy metering (NEM) describes the ability to feed into the grid the energy generated by the regenerative energy source (e.g. solar-generated electricity) and effectively earn the price of the time-specific retail purchase price of electricity for it. In other words, the value indicated by the meter which measures the energy transferred between the grid and the electric consumption unit may be reduced by feeding electric energy from the regenerative energy source and/or from the energy storage into the grid. For example, if the customer feeds in 10 kilowatt-hours (kWh) at an electricity rate of $0.15/kWh, the customer would earn 10 kWh*$0.15/kWh=$1.50 in this time for feeding in this amount of energy to the grid. Customers that do not have a NEM option in their utility tariff would not receive any payment (or bill credit) for the energy that was fed back into the grid. The state of Hawaii was the first state in the United States that implemented such a regulation to cope with the enormous amount of solar energy being overproduced midday. This overproduction represents an economic loss for customers with solar and raises the opportunity for battery energy storage systems to be implemented for shifting energy to other times when there is a greater need for electricity due to higher rates of consumption. It can be predicted that other states may start implementing such regulations when their respective generation with renewable energies increases to a certain percentage of overall grid capacity. Therefore, the control algorithm developed herein covers the case where there is no NEM or similar-type tariff available to customers.

The embodiment provides the advantage that the energy storage will not be charged, if use can be made of any excess power delivered by the regenerative energy source on the basis of the NEM.

The method may also take care of not harming the battery in cases of a low state of charge. Depending on the storage type, e.g. a type of battery, a specific battery threshold limit for discharge can be set. Additionally, this limit or threshold may vary during the different time-of-use periods, as will be described. The reason for this later feature does not only have to do with protecting the battery. This feature ensures availability of battery capacity for use during times when energy prices are higher.

In one embodiment, one of the supply conditions is a partial-peak supply condition which is valid during partial-peak periods and for the partial-peak supply condition a partial-peak operation logic is selected, which comprises the following logic:

if the total unit load is greater 0, indicating a net power consumption, and the state of charge is greater than a partial-peak threshold, a negative power flow is set for discharging the energy storage, if the total unit load is smaller 0, indicating a net power delivery, and if the state of charge is below the maximum level, a positive power flow is set for charging the energy storage. Otherwise, with the energy storage being fully charged, the power flow may be set to 0.

The partial-peak threshold may be larger than the peak threshold. This embodiment provides the advantage that excess electric power delivered by the regenerative energy source is used for charging the energy storage.

In one embodiment, the partial-peak threshold is adapted as a function of at least one count value that indicates the number of days where the peak threshold was reached during peak periods within a predefined observation period (e.g. one month). The adaptive value is set such that the partial-peak threshold is set higher the higher the count value. One count value or, if more than one count value is available, two count values or more than two count values can be used, where each count value (number of days) represents a different observation period. The duration of the observation period may be in the range of one week to half a year, e.g. 1 month. For example, a count value for a respective month of the current year and the previous year may be used. It is not necessary that at least two count values for the adjustable threshold are being used. When no historic value from the respective month in the year before is available, only the one of the current month for the respective time period is used. The embodiment provides the advantage that the energy storage will keep as much energy during the partial-peak periods that the energy storage will not run empty (i.e. reach the peak threshold) in the following peak period. This is of advantage, as the energy in the energy storage is more valuable during peak periods than during partial-peak periods.

In one embodiment, at least two count values are considered, each being valid for another observation period, and the at least two count values are weighted by means of a weighting parameter $\beta$. For example, if two count values are used, two weighting factors, one for each count value, may be derived as $\beta$ and $(1-\beta)$, with $0 \leq \beta \leq 1$. The observation periods may be one year apart such that each observation period falls into the same season of the year. This embodiment provides the advantage that exceptions in one observation period may be compensated by one or more other observation periods.

In one embodiment, the partial-peak threshold is adapted, if the next period is a peak period, and the partial-peak threshold is set to the peak threshold, if the next period is an off-peak period. As the partial-peak threshold may be larger than the peak threshold, this embodiment provides the advantage that maximum use may be made out of the energy in the energy storage, the next period is an off-peak period, where energy from the grid may be cheapest.

In one embodiment, one of the supply conditions is an off-peak supply condition which is valid during off-peak periods and for the off-peak supply condition an off-peak operation logic is selected, which comprises the following logic:

if a time duration remaining until the end of the present off-peak period is shorter than or equal to a predefined stretched Final Charge Window, a positive power flow for charging the energy storage is set to a scaled value which is calculated such that the state of charge reaches a maximum level (100%) at the end of the off-peak period.

This embodiment ensures that at the end of the off-peak periods the energy storage is fully charged.

In one embodiment, the Final Charge Window FCW is a time value needed for charging the energy storage from its present state of charge to the maximum level (100%), if a maximum converter power InvMaxPower of the power converter is used, i.e. the maximum possible power flow, and the stretched Final Charge Window $\alpha$*FCW is the Final Charge Window FCW multiplied by a stretch factor $\alpha$, with $\alpha$ greater than or equal to 1, wherein correspondingly the scaled value is the maximum converter power InvMaxPower divided by the stretch factor $\alpha$, i.e. InvMaxPower/$\alpha$. With $\alpha$=1, the stretched Final Charge Window can be set to the shortest possible value. With $\alpha$>1, the power converter can be operated with less strain.

In one embodiment, the off-peak operation logic comprises that:

if the time duration remaining until the end of the present off-peak period is greater than the stretched Final Charge Window, i.e. more time remains, and (at the same time) if net energy metering (NEM) applies for the electric consumption unit, and the total unit load is greater 0, the power flow is set to 0 independently of the state of charge, and otherwise, if the total unit load is smaller 0, a positive power flow is set for charging the energy storage, if the state of charge is below the maximum value (100%).

The storage system is thus charged from excess energy (negative total unit load) in off-peak times.

In one embodiment, if no net energy metering applies and:

if the total unit load is greater 0, indicating a net power consumption, and the state of charge is greater than a predefined off-peak threshold, a negative power flow is set for discharging the energy storage, if the total unit load is smaller 0, indicating a net power delivery, and if the state of charge is below the maximum level (100%), a positive power flow is set for charging the energy storage. The power flow may be set to 0 otherwise.

This embodiment ensures that the electric consumption unit makes maximum use of the renewable energy from the regenerative energy source during off-peak periods without NEM.

In one embodiment, the off-peak threshold is adapted as a function of at least one count value that indicates the number of days where the partial-peak threshold was reached during partial-peak periods and/or the peak threshold was reached during peak periods within a predefined observation period. The off-peak threshold is set higher the higher the at least one count value. One count value or, if more than one count value is available, two count values or more than two count values can be used, where each count value (number of days) represents a different observation period. For the observation period, the conditions described above may apply. This embodiment provided the advantage that the energy storage runs empty (reaches the peak threshold or the partial-peak threshold) less often during the peak periods and the partial-peak periods.

In one embodiment, at least two count values are considered, each being valid for another observation period, and the at least two count values are weighted by means of a weighting parameter $\gamma$. The parameter $\gamma$ may be used in the same way as the parameter $\beta$ described above. This embodiment compensates exceptions that may occur in a single observation period.

In one embodiment, the absolute value of the power flow is limited by both a maximum converter power of the power converter and the absolute value of the total unit load, whichever is smaller. The limitation is preferably applied when the total unit load is negative. This embodiment ensures that the power converter is not overloaded and that for charging the energy storage only the excess electric power delivered by the regenerative energy source is used, i.e. no net energy from the grid itself is used. In other words, when adjusting the charge or discharge power of the energy storage, i.e., the power flow, the method always tries to meet the consumption/generation at the consumption unit level within the borders of the maximum charge and discharge capabilities (maximum converter power) of the stationary storage system.

For running an energy storage according to an embodiment of the inventive method, the invention provides a control device for controlling an electric power flow of an electric energy storage, wherein the control device comprises a processing unit that is designed to perform the method. As the inventive method is an algorithmic control logic, the method is preferably implemented in a cloud architecture component, i.e. the processing unit may be provided in the form of a network server architecture. The processing unit may be based on at least one central processing unit (CPU) and/or at least one micro-controller. The steps of the method may be implemented on the basis of a programming code that may comprise instructions that are designed to make the processing unit execute the method when the processing unit executes the programming code. The programming code may be stored in a computer readable medium, e.g. a data storage.

The invention also comprises the described system comprising an electric consumption unit and an electric energy storage and a control device according to the invention.

The invention also comprises the combinations of the features of the different embodiments.

Other objects, advantages and novel features of the present invention will become apparent from the following detailed description of one or more preferred embodiments when considered in conjunction with the accompanying drawings.

DETAILED DESCRIPTION OF THE DRAWINGS

The embodiments explained in the following is a preferred embodiment of the invention. However, in the embodiment, the described components of the embodiment each represent individual features of the invention which are to be considered independently of each other and which each develop the invention also independently of each other and thereby are also to be regarded as a component of the invention in an individual manner or in another than the shown combination. Furthermore, the described embodiment can also be supplemented by further features of the invention already described.

In the figures, identical reference signs respectively indicate elements that provide the same functionality.

Figure 1:
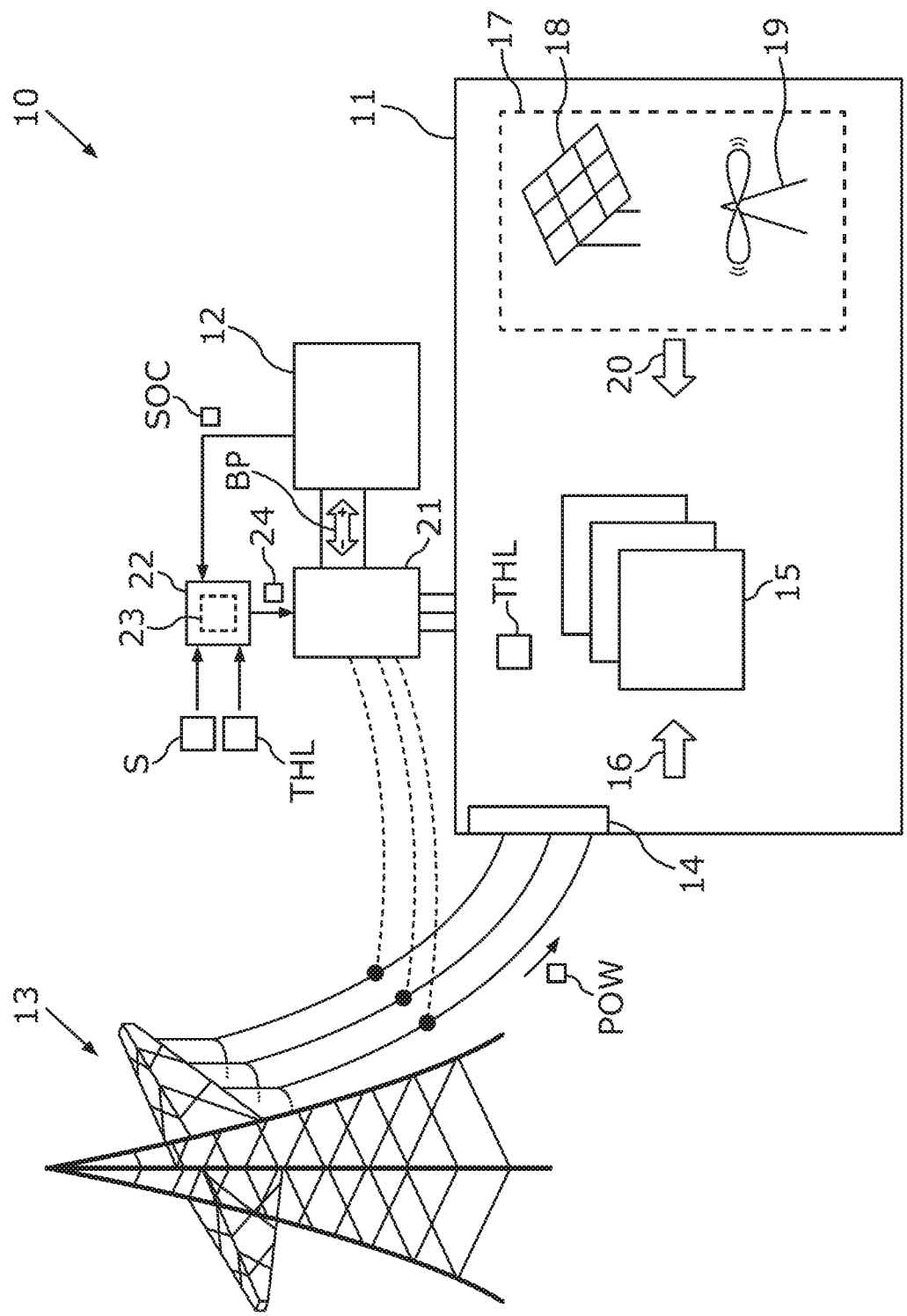
FIG. 1 is a schematic illustration of a system according to an embodiment of the invention.

FIG. 1 illustrates a system 10 that may comprise an electric consumption unit 11 and an electric energy storage 12 that may be provided for the electric consumption unit 11. The electric consumption unit 11 may be, for example, a household or an office building. In the following, it may be assumed that the energy storage 12 may comprise at least one rechargeable battery. For the sake of simplicity, but without any limiting character, it may be assumed that the electric consumption unit is a household that the energy storage 12 is a battery (i.e. energy storage 12 is referred to as a battery).

The consumption unit 11 may be connected to an electric power grid 13. By means of the power grid 13, electric power POW may be transferred from, e.g., an electric power plant (for example a nuclear power plant) to the consumption unit 11. The consumption unit 11 may be connected to grid 13 together with other consumption units. The connection of consumption unit 11 may be obtained by means of a meter 14 which may measure the amount of electric energy provided to the consumption unit 11.

Within consumption unit 11, at least one electric consumer 15 may consume electric energy resulting in electric power consumption 16. Additionally, a regenerative energy source 17 may be provided. Energy source 17 represents all electric sources that may provide renewable electric energy. The energy source 17 may comprise at least one photovoltaic or solar device 18 and/or at least one electric generator driven by wind. The regenerative energy source 17 may provide an electric power delivery 20. By means of the power delivery 20, the power consumption 16 may be at least partially compensated resulting in an overall net balance value which is termed here as total unit load THL describing, e.g., a total household load.

An electric power flow BP into the energy storage 12 may be controlled by means of a power converter 21 which can be, e.g., an electric inverter, particularly a bidirectional inverter. In the present description, a positive power flow BP indicates the transfer of electric energy into the energy storage, i.e. a charge CHRG, wherein a negative power flow BP indicates a discharge DIS off energy out of the energy storage 12. The converter 21 may be connected to the energy consumption unit 11 or it may directly be connected to grid 13, which is indicated in FIG. 1 by use of dashed lines. In the case that the converter 21 is directly connected to grid 13, an energy flow between inverter 21 and grid 13 may also be considered by meter 14 or by the utility provider of grid 13.

The converter 21 may be controlled by a control device 22 which may comprise a processing unit 23 for generating a control signal 24 for controlling converter 21. Control device 22 may observe a state of charge SOC of energy storage 12 and the total unit load THL. Additionally, control device 22 may receive a status signal S which indicates a present supply condition C1, C2, C3 and/or a future (upcoming) supply condition, as it may be provided by grid 13.

Figure 2:
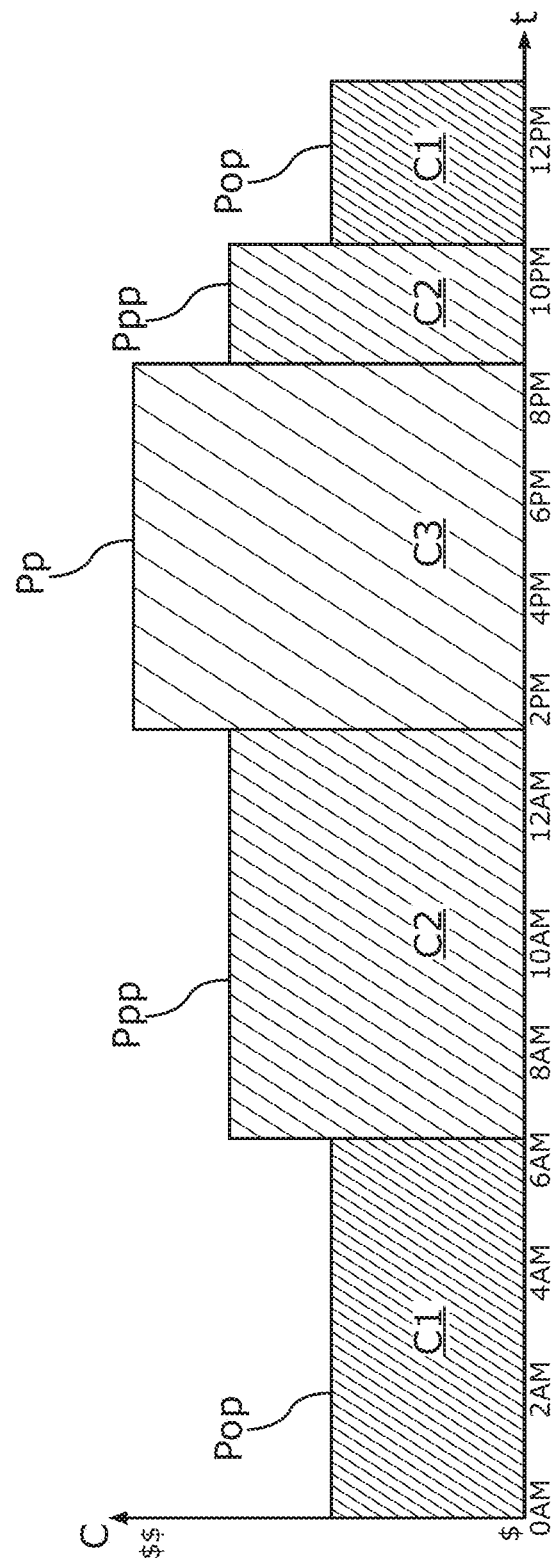
FIG. 2 is a diagram illustrating different time periods during which different supply condition apply.

FIG. 2 shows an example rate structure from Pacific Gas and Electric Company's (PG&E) tariff 'EVA'. FIG. 2 illustrates a possible time-order of different time periods (Time-of-Use Times) for which different tariffs, i.e. supply conditions, apply: an off-peak period Pop, a peak period Pp and in between there is a partial-peak period Ppp. For each of the different supply conditions, the costs C for delivered energy may be different. Cost C may refer to monetary costs, i.e. the price of electric energy. Costs C may refer to environmental costs, i.e. the type of energy source used for providing electric power in the grid (nuclear power, fossil power, renewable energy).

For power grids like the grid 13 (e.g. in the United States), the utility providing electric power POW may have time-of-use based electricity tariffs in their portfolios. Time-of-use rates incentivize the usage of energy at certain times when it's considered most beneficial for the electricity grid. There are differences among utilities on the specifics of these time-of-use rates, however, the underlying principal of the structure of these types of rates tends to be the same. Energy prices are lower in off-peak times. Off-peak times are typically found at night during the late evening and early morning hours when the electricity demand from households is usually quite low. This creates a lot of opportunities for charging electric vehicles or stationary battery storage systems at night, for example. Normally, tariffs have two to three different pricing periods. The proposed algorithmic logic described in more detail below can be used for these types of time-of-use tariffs.

Figure 3:
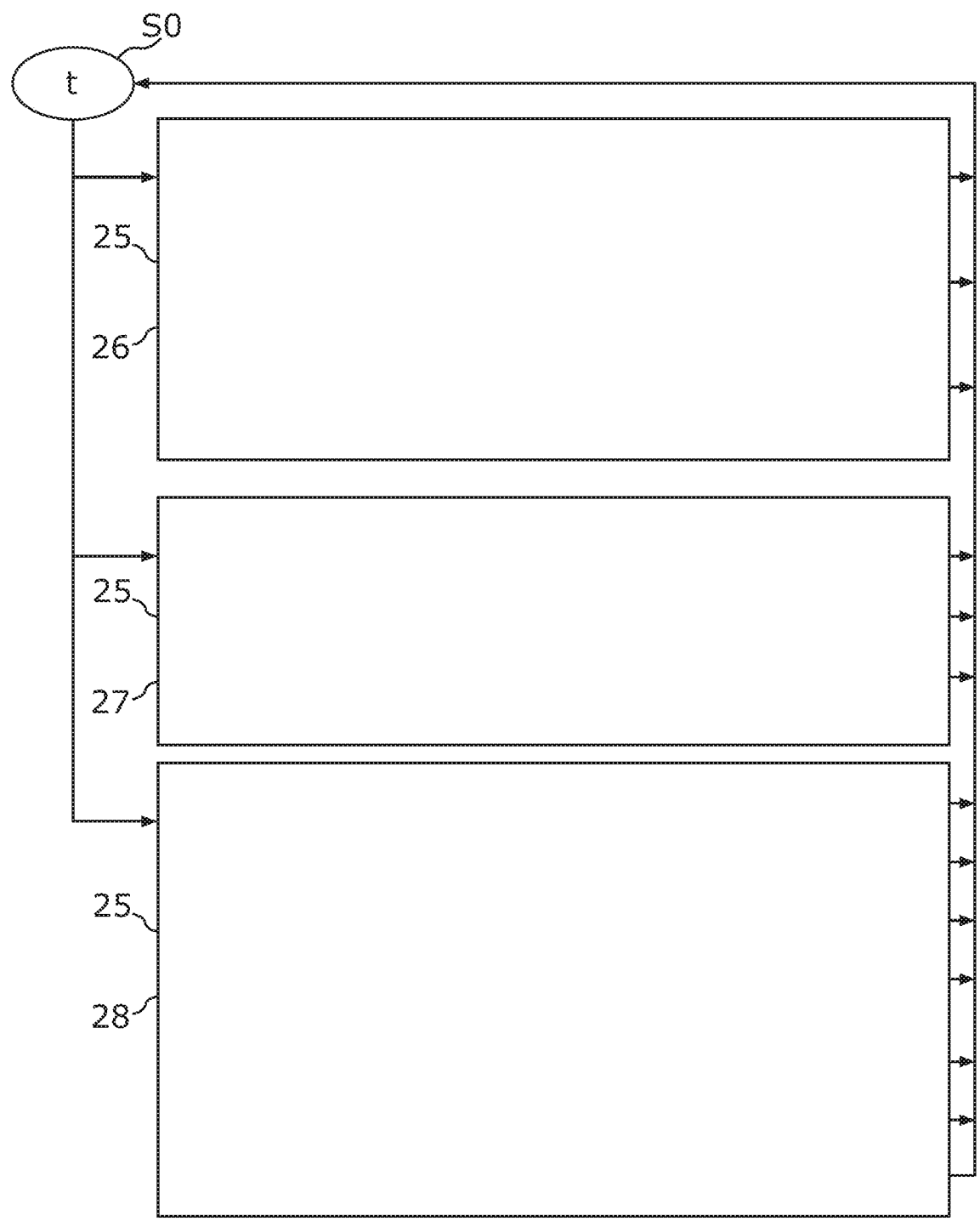
FIG. 3 is a flowchart of a method that may be performed by a control device of the system of FIG. 1.

FIG. 3 illustrated a flowchart of a method for operating the energy storage 12 in the case of time-of-use based tariffs. The method may be performed by the control device 22.

The overall goals of the illustrated algorithm for operating the stationary battery energy storage device at residential households with time-of-use tariffs are to minimize customer electricity bills by charging the battery at times of low cost (Off-Peak, Partial-Peak) and discharging the battery to onsite loads during times of high cost (Peak) as well as maximizing the usage of onsite (in the electric consumption unit 11) solar generated electricity in the customer's energy usage profile. The algorithm takes into account in which time-of-use period the customer is currently and which time-of-use period is coming up next. Given different constraints such as solar generation onsite and a net energy metering tariff option, an intelligent cycling of the battery is determined.

For each current or present point of time t, one out of several operation logics 25 may be chosen in a Step S0 as a function of the status signal S. For example, at least one of the following operation logics 25 may be provided: a peak operation logic 26 for peak periods Pp, a partial-peak operation logic 27 for partial-peak periods Ppp and/or an off-peak operation logic 28 for off-peak periods Pop.

Figure 4:
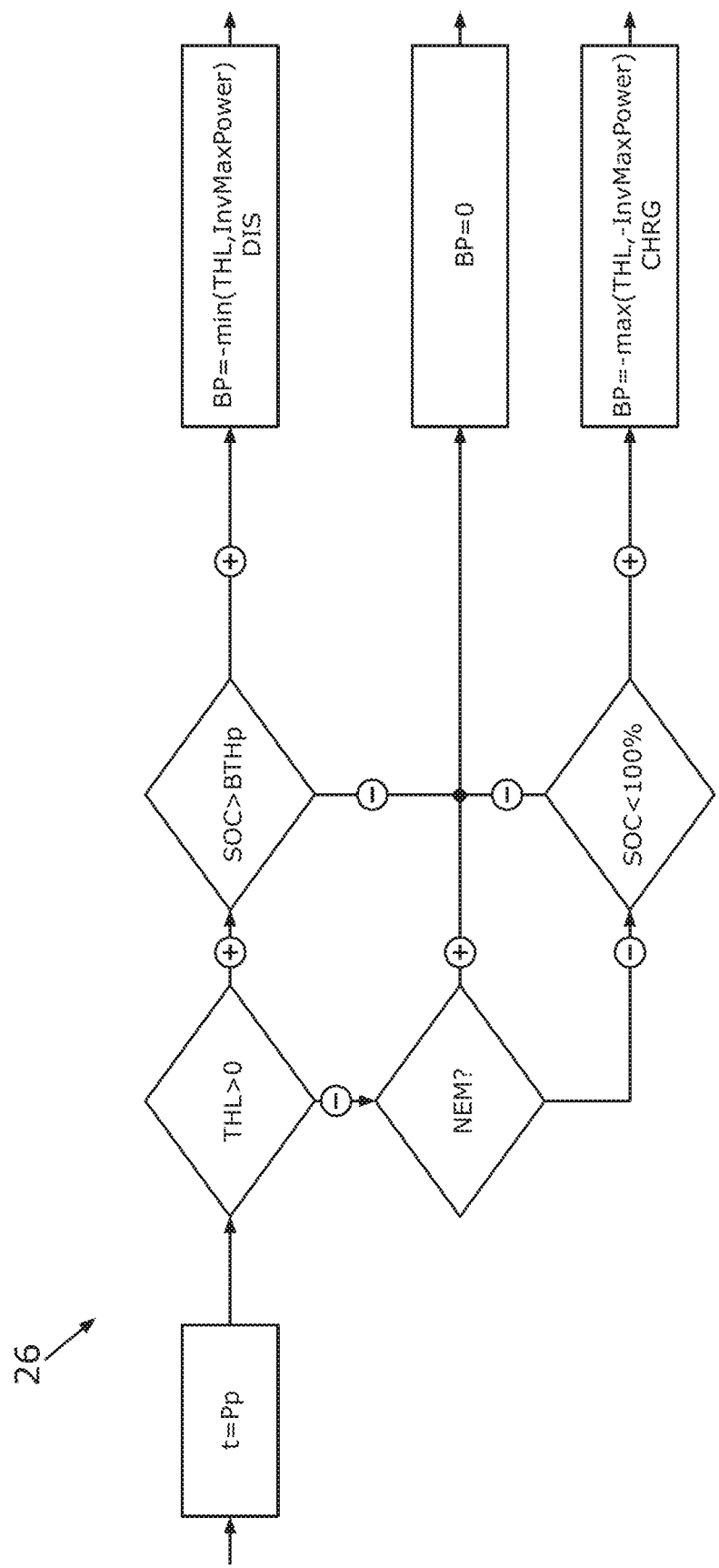
FIG. 4 is a flowchart of a peak operation logic.

FIG. 4 illustrates a flowchart for a peak control-scheme, i.e. the peak operation logic 26, which is chosen when the current time t falls into a peak period Pp. In the flowcharts shown here, a "+"-Sign indicates "True" for the respective preceding logical test, and a "−"-Sign indicates "False".

As can be seen in FIG. 4, the control algorithm during peak times first checks the Total Unit Load (THL) of the customer, i.e. of the electric consumption unit. This is the net load value, in power terms (such as kW), which is recorded by the electricity meter at the house. If the value is positive, then there is net consumption at the customer's house. If the value is negative, the PV panels (if existing) are generating more energy than is being consumed at that time. If no PV panels exist, then the net demand value can never be negative. If the net load is positive (=consumption), the battery will discharge to either onsite loads or the grid depending on the electrical wiring of the battery at the household with either maximum inverter power or power equivalent to the consumption rate of the customer, whichever is lower. Pushing additional energy to the grid beyond what is consumed onsite is not desired since the battery system is not considered a renewable resource. Furthermore, discharge of the battery will only take place when the battery state of charge (SOC) is above a defined peak threshold limit (called Battery Threshold or BTHp) of the SOC as to not harm the battery in the long-term. If the THL is below zero (=generation), the control algorithm distinguishes between customers that are eligible to sell electricity to the grid (NEM=true) and customers that will not be reimbursed for any excess energy produced (NEM=false). If the customer is on a NEM or similar tariff, the battery will not be used in times of excess solar generation even in peak times to benefit from the high energy prices at this time. If the customer does not have the NEM tariff option, the battery will charge from excess solar production.

However, the battery can only charge with excess solar production up to the limit of the maximum inverter power. If the battery is fully charged, the battery charging power will be set to zero. In FIG. 4 and the following figures, min( . . . ) is the minimum operator choosing the smallest value and max( . . . ) is the maximum operator choosing the largest value.

Figure 5:
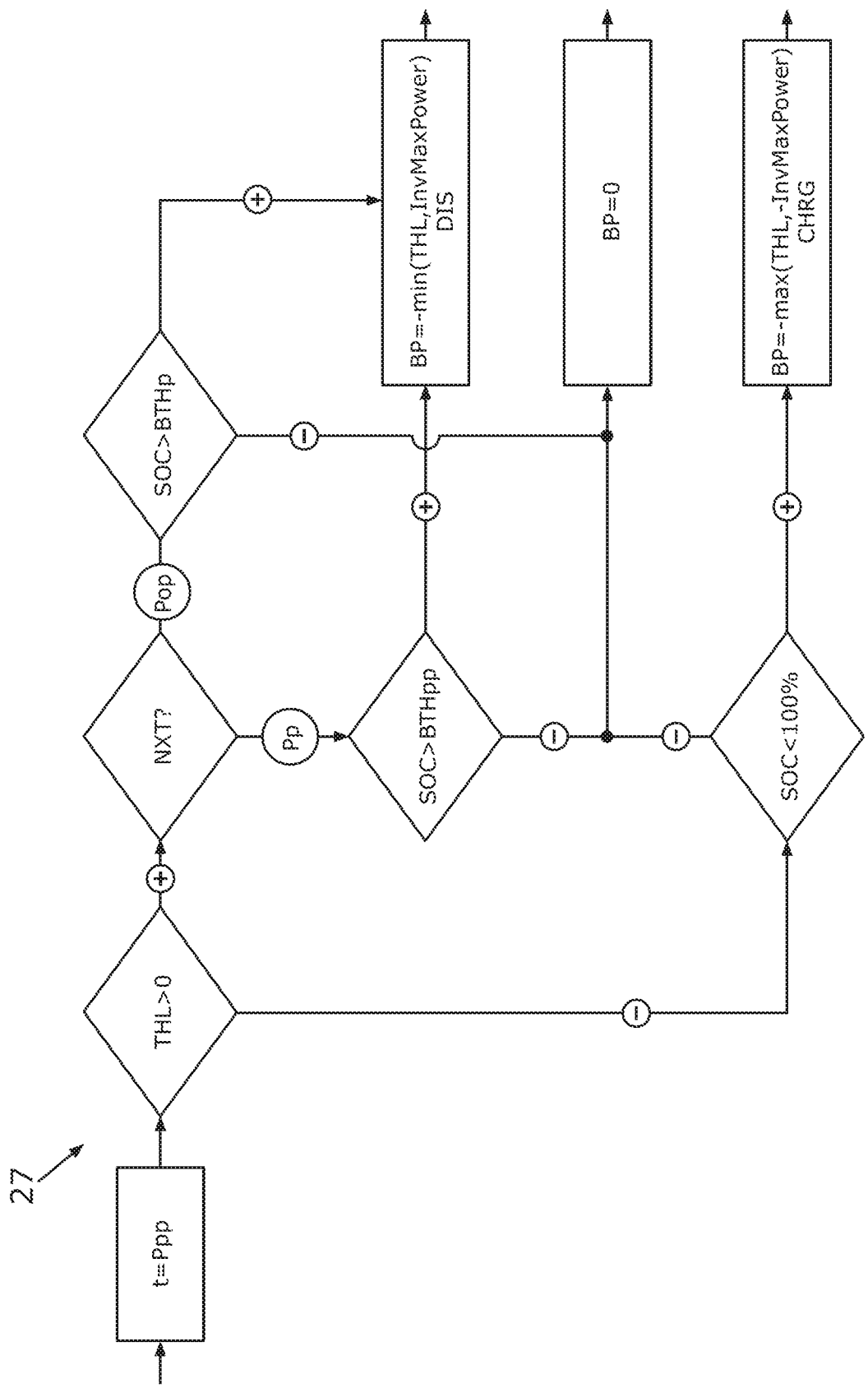
FIG. 5 is a flowchart of a partial-peak operation logic.

FIG. 5 illustrates a flowchart for a partial-peak control-scheme, i.e. the partial-peak operation logic 27, which is chosen when the current time t falls into a partial-peak period Ppp.

In partial peak times the battery will either be charged or discharged depending on the net load of the customer. The logic follows the same scheme as that from peak times. The battery will charge when there is excess solar production and discharge when there is a positive net electricity consumption. NEM does not play a role in partial peak times because it is more valuable to store the excess solar generation during these times in the battery than sell it to the grid so that we are guaranteed to be fully charged before a peak period and avoid drawing from the grid for supporting onsite loads during the most expensive electricity price period.

If the next period after the partial-peak period Ppp is a peak period Pp, the discharge capability in partial peaks is limited to a defined battery threshold value BTHpp (pp meaning partial-peak). This value differs from the one in peak times, but it is dependent on it. The following equation is used for determining the battery threshold in partial peak times (BTHpp):

$$BTHpp(month)=(\beta*DoDp\_ratio\_last+(1-\beta)*DoDp\_p\_ratio)/2*(1-BTHp)+BTHp$$

where
DoDp_ratio(month)=
(number of days where BTHp was reached in the month)/ (number of days in the month)
and DoDp_ration_last is the respective value for the same month in the previous year. BTHp is a predefined value defining the lowest allowable state of charge of the battery during peak periods. β is an adjustable weighting factor between 0 and 1 that puts the relevance of the historic data into relation to the data of the current month. This logic ensures that the battery threshold limit in partial peak periods is regularly adjusted to the battery usage in peak times to ensure enough available capacity in times where energy prices are the most expensive. Additionally, historic values are put into the calculation to increase reliability of these limits and minimize stochastic errors.

If the next period after the partial-peak period Ppp is an off-peak period Pop, then the battery will discharge until the battery peak threshold limit from peak times BTHp, not BTHpp to fully utilize the capacity of the battery and recharge in off-peak times.

Figure 6:
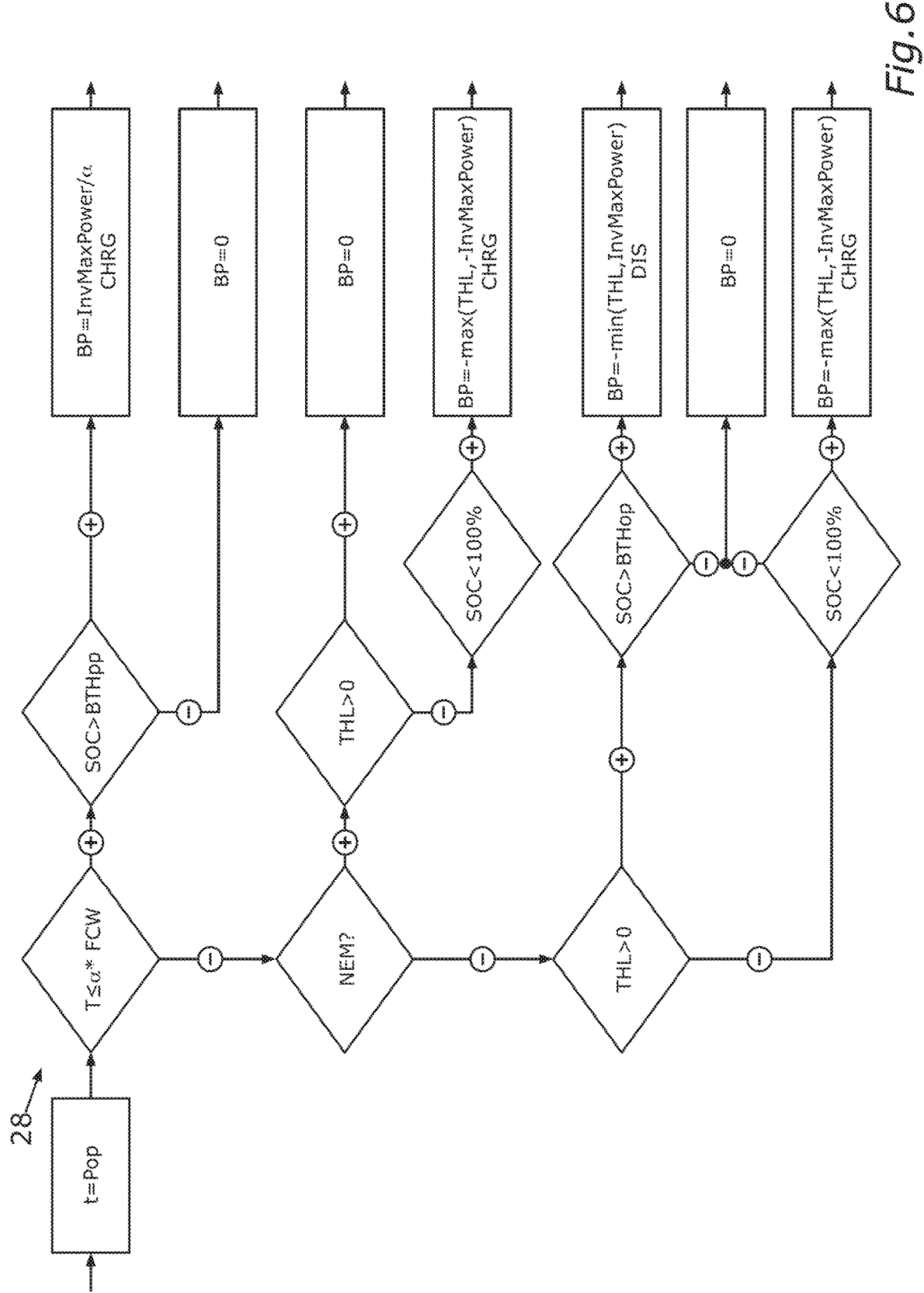
FIG. 6 is a flowchart of an off-peak operation logic.

FIG. 6 illustrates a flowchart for an off-peak control-scheme, i.e. the off-peak operation logic 28, which is chosen when the current time t falls into a off-peak period Pop.

For off-peak periods, the first thing to check is whether the time remaining in the off-peak period is equal to or less than the time required to recharge the battery fully. The Final Charge Window (FCW) is the calculation of the remaining charging time with maximum charging power. For battery safety reasons this timeframe can be stretched in order to charge the battery with a lower rate to minimize harm to the battery. This is provided by the factor α which extends the charging window by dividing the maximum battery charging power (InvMaxPower) according to the following relation:

$$T \leq \alpha*FCW \text{ then effective Inverter Charging Power is } InvMaxPower/\alpha$$

with $\alpha \geq 1$ and α a real number.

If the remaining available time T until the next partial peak or peak period is longer than α*FCW, the battery will be charged from excess solar only, when available. This logic ensures that there will be as much solar energy as possible in the battery. Alternatively, if the available time until the next partial peak or peak period is less than α*FCW, the battery will be charged from the grid when there is no excess solar available to ensure that the battery is fully charged before the next higher-priced period. Even if there is excess renewable energy (solar) available, the energy storage will be charged by InvMaxPower/alpha. It is possible that the battery is going to be charged partially from excess renewable energy (solar) and additional grid power, if the generation of excess renewable energy (solar) is less than the needed battery power for meeting the requirements to meet the FCW time.

Additionally, the control scheme in off-peak times depends on whether the customer is on a NEM tariff or not. If the customer does not have a NEM tariff, the algorithm logic follows that of the battery during partial peak times. Furthermore, customers that do not have a NEM tariff will not get reimbursed for excess energy that is fed back into the grid which results in the customer wanting to utilize excess solar onsite to flatten his/her load when there is net consumption in his/her load profile. Therefore, the algorithm decides to discharge to onsite loads when there is net consumption at the house. This discharge to the household load is limited by a variable battery threshold limit BTHop (month) which will be adjusted according to the following equation:

$$BTHop(month)=(\gamma*DoDpp\_ratio\_last+(1-\gamma)*DoDp\_p\_ratio)/2*(1-BTHpp)+BTHpp$$

where

DoDpp_ratio(month)=
(number of days where BTHpp was reached in the month)/(number of days in the month)

and DoDpp_ratio_last is the respective value for the same month in the previous year.

If the respective tariff does not have partial peaks, the equation may be chosen as:

$$BTHop(month)=(\gamma*DoDp\_ratio\_last+(1-\gamma)*DoDp\_ratio)*(1-BTHp)+BTHp$$

This adaptive battery threshold limit during off-peak times is utilized to provide enough available battery capacity for usage during partial peak and peak times to increase the economic benefit for the residential customer. If the customer is on a NEM tariff and there is net consumption at the household, the battery is not discharged to onsite loads. Electricity prices are lowest in off-peak times and therefore, there would not be an economic incentive to discharge the battery. If we assume that the battery is not fully charged at the beginning of the off-peak period, then the control scheme charges the battery from excess solar energy to increase percentage of renewable energy in the battery. Discharging to the grid in times of consumption might require energy to be drawn from the grid in the FinalChargeWindow to ensure a fully charged battery before the next partial peak or peak period. This would result in higher efficiency losses and less renewable energy stored in the battery.

The described methodology takes into account the specific utility rate tariffs and combines the use cases of energy arbitrage with solar self-consumption to find the cycling algorithm that provides the most cost savings for the user.

The implementation example shows, how a battery cycling algorithm for a stationary storage system in a residential environment can be provided.

REFERENCE SIGNS 10 system
11 electric consumption unit
12 energy storage
13 power grid
14 meter
15 electric consumer
16 power consumption
17 regenerative energy source
18 photovoltaic panel
19 wind generator
20 power delivery
21 power converter
22 control device
23 processing unit
24 control signal
25 operation logic
26 peak operation logic
27 partial-peak operation logic
28 off-peak operation logic
C costs
C1, C2, C3 supply condition
BP power flow
BTHp peak threshold
BTHpp partial-peak threshold
BTHop off-peak threshold
NEM net energy metering
InvMaxPower maximum converter power
POW electric power
Pop off-peak period
Ppp partial-peak period
Pp peak period
S status signal
SOC state of charge
t time
THL total unit load The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an electric energy storage that is provided for an electric consumption unit, wherein the electric consumption unit is additionally coupled to an electric power grid and wherein the grid supplies electric power to the consumption unit under different supply conditions at different time periods and wherein a control device observes a state of charge of the energy storage and controls an electric power flow of the energy storage by way of an electric power converter, the method comprising the steps of:

providing different operation logics for controlling power flow as a function of the state of charge and as a function of a total unit load, wherein the total unit load is a net balance value of a power consumption in the consumption unit and an internal power delivery in the consumption unit;

observing a status signal that is signaling a present and/or a next supply condition of the grid;

selecting one of the operation logics as an active operation logic depending on a current value of the status signal; and operating the power converter according to the active operation logic, wherein:

one of the supply conditions is an off-peak supply condition which is valid during off-peak periods and for the off-peak supply condition an off-peak operation logic is selected, which off-peak operation logic comprises:

upon determining that a time duration remaining until the end of the present off-peak period is shorter than or equal to a predefined stretched Final Charge Window, a positive power flow for charging the energy storage is set to a scaled value which is calculated such that the state of charge reaches a maximum level at the end of the off-peak period, a Final Charge Window is a time value needed for charging the energy storage from its present state of charge to the maximum level, while a maximum converter power of the power converter is used, and the stretched Final Charge Window is the Final Charge Window multiplied by a stretch factor a, with a greater than or equal to 1, wherein said scaled value is the maximum converter power divided by the stretch factor α.

2. The method according to claim 1, wherein one of the supply conditions is a peak supply condition which is valid during peak periods and, for the peak supply condition, a peak operation logic is selected, which peak operation logic comprises:

upon determining that the total unit load is greater than 0, indicating a net power consumption, and that the state of charge is greater than a predefined peak threshold, a negative power flow is set for discharging the energy storage, upon determining that the total unit load is smaller than 0, indicating a net power delivery:
in the case that net energy metering applies for the electric consumption unit, the power flow is set to 0 independently of the state of charge, and
in the case that net energy metering does not apply for the electric consumption unit, and the state of charge is below a predefined maximum level, a positive power flow is set for charging the energy storage.

3. The method according to claim 2, wherein one of the supply conditions is a partial-peak supply condition which is valid during partial-peak periods and for the partial-peak supply condition a partial-peak operation logic is selected, which partial-peak operation logic comprises:
upon determining that the total unit load is greater than 0, indicating a net power consumption, and that the state of charge is greater than a predefined partial-peak threshold, a negative power flow is set for discharging the energy storage,
upon determining that the total unit load is smaller than 0, indicating a net power delivery, and that the state of charge is below the maximum level, a positive power flow is set for charging the energy storage.

4. The method according to claim 3, wherein
the partial-peak threshold is adapted as a function of at least one count value that indicates a number of days where the peak threshold was reached during peak periods within a predefined observation period.

5. The method according to claim 4, wherein
at least two count values are considered, each being valid for another observation period, and
the at least two count values are weighted by a weighting parameter $\beta$.

6. The method according to claim 5, wherein the partial-peak threshold is adapted upon determining that the next period is a peak period, and otherwise the partial-peak threshold is set to the peak threshold upon determining that the next period is an off-peak period.

7. The method according to claim 4, wherein the partial-peak threshold is adapted upon determining that the next period is a peak period, and otherwise the partial-peak threshold is set to the peak threshold upon determining that the next period is an off-peak period.

8. The method according to claim 1, wherein for the off-peak operation logic:
upon determining that the time duration remaining until the end of the present off-peak period is greater than the stretched Final Charge Window, and that net energy metering applies for the electric consumption unit:
upon determining that the total unit load is greater than 0, indicating a net power consumption, the power flow is set to 0 independently of the state of charge, and
upon determining that the total unit load is smaller than 0, indicating a net power delivery, and that at the same time the state of charge is below maximum value, a positive power flow is set for charging the energy storage.

9. The method according to claim 8, wherein
upon determining that no net energy metering applies, then:
upon determining that the total unit load is greater than 0, indicating a net power consumption, and that the state of charge is greater than a predefined off-peak threshold, a negative power flow is set for discharging the energy storage, and
upon determining that the total unit load is smaller than 0, indicating a net power delivery, and that the state of charge is below the maximum level, a positive power flow is set for charging the energy storage.

10. The method according to claim 9, wherein
the off-peak threshold is adapted as a function of at least one count value that indicates a number of days where the partial-peak threshold was reached during partial-peak periods and/or the peak threshold was reached during peak periods within a predefined observation period.

11. The method according to claim 10, wherein
at least two count values are considered, each being valid for another observation period, and the at least two count values are weighted by a weighting parameter $\gamma$.

12. The method according to claim 1, wherein
the absolute value of the power flow is limited by both a maximum converter power of the power converter and the absolute value of the total unit load.

13. A control device for controlling an electric power flow of an electric energy storage, wherein the control device comprises a processing unit that is operatively configured to carry out the acts of:
providing different operation logics for controlling power flow as a function of the state of charge and as a function of a total unit load, wherein the total unit load is a net balance value of a power consumption in the consumption unit and an internal power delivery in the consumption unit;
observing a status signal that is signaling a present and/or a next supply condition of the grid;
selecting one of the operation logics as an active operation logic depending on a current value of the status signal; and
operating the power converter according to the active operation logic, wherein:
one of the supply conditions is an off-peak supply condition which is valid during off-peak periods and for the off-peak supply condition an off-peak operation logic is selected, which off-peak operation logic comprises:
upon determining that a time duration remaining until the end of the present off-peak period is shorter than or equal to a predefined stretched Final Charge Window, a positive power flow for charging the energy storage is set to a scaled value which is calculated such that the state of charge reaches a maximum level at the end of the off-peak period,
a Final Charge Window is a time value needed for charging the energy storage from its present state of charge to the maximum level, while a maximum converter power of the power converter is used, and
the stretched Final Charge Window is the Final Charge Window multiplied by a stretch factor a, with a greater than or equal to 1, wherein said scaled value is the maximum converter power divided by the stretch factor $\alpha$.

14. A system, comprising:
an electric consumption unit,
an electric energy storage,
an electric power converter by which electric power flow to/from the electric energy storage; and
a control device comprises a processing unit that is operatively configured to carry out the acts of:
providing different operation logics for controlling power flow as a function of a state of charge of the energy store and as a function of a total unit load, wherein the total unit load is a net balance value of a power consumption in the consumption unit and an internal power delivery in the consumption unit;

observing a status signal that is signaling a present and/or a next supply condition of the grid;

selecting one of the operation logics as an active operation logic depending on a current value of the status signal; and operating the power converter according to the active operation logic, wherein:

one of the supply conditions is an off-peak supply condition which is valid during off-peak periods and for the off-peak supply condition an off-peak operation logic is selected, which off-peak operation logic comprises:

upon determining that a time duration remaining until the end of the present off-peak period is shorter than or equal to a predefined stretched Final Charge Window, a positive power flow for charging the energy storage is set to a scaled value which is calculated such that the state of charge reaches a maximum level at the end of the off-peak period, a Final Charge Window is a time value needed for charging the energy storage from its present state of charge to the maximum level, while a maximum converter power of the power converter is used, and the stretched Final Charge Window is the Final Charge Window multiplied by a stretch factor a, with a greater than or equal to 1, wherein said scaled value is the maximum converter power divided by the stretch factor α.

* * * * *